(12) United States Patent
Knapp et al.

(10) Patent No.: US 7,106,224 B2
(45) Date of Patent: Sep. 12, 2006

(54) COMMUNICATION SYSTEM AND METHOD FOR SAMPLE RATE CONVERTING DATA ONTO OR FROM A NETWORK USING A HIGH SPEED FREQUENCY COMPARISON TECHNIQUE

(75) Inventors: David J. Knapp, Austin, TX (US); John G. Maddox, Northborough, MA (US); Joseph B. Gaalaas, Worcester, MA (US)

(73) Assignee: Standard Microsystems Corporation, Hauppauge, NY (US)

( * ) Notice: Subject to any disclaimer, the term of this patent is extended or adjusted under 35 U.S.C. 154(b) by 457 days.

(21) Appl. No.: 10/218,349

(22) Filed: Aug. 14, 2002

(65) Prior Publication Data

US 2004/0032350 A1 Feb. 19, 2004

(51) Int. Cl.
  *H03M 7/00* (2006.01)
(52) U.S. Cl. .............................. 341/61; 341/61; 341/72
(58) Field of Classification Search ................ 370/465, 370/470, 503, 506, 509, 510, 512, 105.1, 370/100.1, 105.3; 375/355, 356; 341/61, 341/111, 113
See application file for complete search history.

(56) References Cited

U.S. PATENT DOCUMENTS

| | | | | |
|---|---|---|---|---|
| 5,128,939 A | * | 7/1992 | Takatori et al. | 370/509 |
| 5,426,643 A | * | 6/1995 | Smolinske et al. | 370/506 |
| 5,638,010 A | * | 6/1997 | Adams | 327/105 |

(Continued)

FOREIGN PATENT DOCUMENTS

EP  0 841 767  5/1998

(Continued)

OTHER PUBLICATIONS

Lau et al., "Synchronous Techniques for Timing Recovery in BISDN," IEEE Transactions on Communications, vol. 43, No. 2-4, 1995, pp. 1810-1818, no month.

(Continued)

*Primary Examiner*—Linh Nguyen
(74) *Attorney, Agent, or Firm*—Kevin L. Daffer; Daffer McDaniel, LLP (57) ABSTRACT

A communication system, source and destination ports of the communication system, and methodology is provided for transporting data in one of possibly three different ways. Data is transported across the network at a frame sample rate that can be the same as or different from the sample rate or master clock within the source port or the destination port. If the sample rate of the source port is known, the sample rate of the destination port can be created using a PLL within the destination port and simply employing a phase comparator in the source port. The phase comparator forwards the phase or frequency difference of the network transfer rate and the source sample rate to the destination port, which then generates a local clock equivalent to the source which then compiles audio data being played at the same rate in which it was sampled at the source. Where economically feasible, sample rate conversion can be used at the source. However, sample rate conversion at the destination is preferred if the source sample rate is forwarded across the network relative to the frame transfer rate of the synchronous network. The sample rate converter simply produces a play rate from the transmitted information at the destination. Again, however, sample rate conversion compares relative phase difference changes similar to the phase difference compared in the digital PLL mode. As a further alternative, sample rates within the source and destination ports can be derived from the network frame rate using fractional dividers in the source and destination ports.

33 Claims, 6 Drawing Sheets

U.S. PATENT DOCUMENTS

| | | | |
|---|---|---|---|
| 5,648,778 A * | 7/1997 | Linz et al. | 341/110 |
| 5,786,778 A * | 7/1998 | Adams et al. | 341/61 |
| 5,790,608 A * | 8/1998 | Benayoun et al. | 375/356 |
| 6,057,789 A * | 5/2000 | Lin | 341/61 |
| 6,151,479 A | 11/2000 | Kummer | |
| 6,584,574 B1 * | 6/2003 | Embree | 713/400 |
| 6,611,537 B1 * | 8/2003 | Edens et al. | 370/503 |

FOREIGN PATENT DOCUMENTS

| | | |
|---|---|---|
| EP | 0 912 004 | 4/1999 |
| EP | 1 130 833 | 9/2001 |
| EP | 1130833 * | 9/2001 |

OTHER PUBLICATIONS

Partial International Search Report, application No. PCT/US 03/25182, mailed Jan. 12, 2004.

Heck et al., Media Oriented Synchronous Transfer—A Network Protocol for High Quality, Low Cost Transfer of Synchronous, Asynchronous, and Control Data on Fiber Optic, 1997, pp. 1-15, no month.

International Search Report, application No. PCT/US 03/25182, mailed Mar. 25, 2004.

"192 kHz Stereo Asynchronous Sample Rate Converter," Analog Devices AD1896, © 2001, pp. 1-24, no month.

* cited by examiner

COMMUNICATION SYSTEM AND METHOD FOR SAMPLE RATE CONVERTING DATA ONTO OR FROM A NETWORK USING A HIGH SPEED FREQUENCY COMPARISON TECHNIQUE

BACKGROUND OF THE INVENTION

1. Field of the Invention

This invention relates to a communication system, such as a network of interconnected nodes for sending streaming data and non-streaming data across a network having a frame transfer rate that is dissimilar from the local clock rate of the data at the source or destination nodes. The source and destination nodes can include a port, wherein the source port preferably includes a phase comparator that compares successive changes in phase between the network frame rate and the source or sample rate and forwards the pertinent information to the destination port which can then perform sample rate conversion using the sample rate of the source relative to the frame transfer rate.

2. Description of the Related Art

Communication systems are generally well known as containing at least two nodes interconnected by a transmission line. Each node may include a data source and/or a data destination. If the node is configured to transmit data into the network, the node is known as a source port. Another node can be configured to receive data from the network and is sometimes known as a destination port. A node can be configured to source data during one transaction and receive data during another transaction and, therefore, is a transceiver. Each source port and each destination port may comprise a port, hereinafter known as a source port and a destination port. The source port is used to source the input data onto the network, and the destination port receives data from the network. The source port can be configured on a single monolithic substrate as an integrated circuit that is coupled to other subsystems within the source port. Similarly, the destination port is an integrated circuit within the destination port.

It is generally desirable that the transmission line of the network accommodate not only digital data, but also data that can arrive as voice data, audio data, video data, or bursts of data derived from a computer domain. An optimal transmission line is, therefore, one that can receive information from a multimedia device herein defined as any hardware and/or software module that can transfer information in whatever form upon the network. The transmission line can either be a copper wire, optical fiber, or a wireless transmission medium.

There are many types of multimedia devices. For example, a multimedia device can include a telephone, a compact disc (CD) player, a digital video disc (DVD) player, a computer, an amplifier, a speaker, or any device which can send and receive different types of data across a transmission line of the network.

Popular types of data include streaming data or packetized data. Streaming data is data that has a temporal relationship between samples produced from a source port onto the network. The relationship between those samples must be maintained across the transmission line to prevent perceptible errors, such as gaps or altered frequencies. A loss in the temporal relationship can cause a receiver at a destination port to present jitter, echo, or, in the worst instance, periodic blanks in the voice or video stream. Converse to streaming data, packetized data is data which need not maintain the sample rate or temporal relationship of that data and, instead, can be sent as disjointed bursts across the transmission line. The packets of data can be sent across the transmission line at virtually any rate at which the transmission line transfers data and is not dependent, in any fashion, on any sampling frequency since packetized data is generally recognized as non-sampled data.

Depending on the frequency difference between the local clock of the source port (or destination port) and the network frame transfer rate, streaming data can be sent either synchronously or isochronously across the network. If the sample rate (i.e., "fs") local to the node is at the same frequency as the frame synchronization rate (i.e., "FSR") of the transmission line, then the streaming data can be sent synchronously across the network. However, in many instances, FSR is dissimilar from fs. Thus, the sample rate must be changed (or converted) or the streaming data must be sent isochronously across the network, where isochronous transfer protocols are used to accommodate the frequency differences in order to prevent perceptible gaps, errors, jitter, or echo.

One methodology in which to prevent sending data isochronously is to sample rate convert the data at the source before the data is sent onto the network. There are various sample rate converters currently available on the market. For example, Analog Devices offers part no. AD1896 that converts the sample rate offered by the local clock to another sample rate synchronous to, for example, another clock. Either increasing or decreasing the sample rate would therefore be beneficial if, indeed, a system can be employed that can match fs to FSR.

In order to implement sample rate conversion in a network environment, a frequency comparator is needed to compare the local sample rate clock to the frame transfer rate and, depending on that frequency comparison, modify the sample rate to match FSR. Conventional frequency comparators typically use a timer that formulates the frequency comparison after several samples are taken over multiple clock cycles. Once the necessary number of clock cycles has occurred, the frequency difference is then measured and, for example, impulse response coefficients of the FIR digital filter within the sample rate converter are set. Of course, this requires a fairly complex digital filter and a digital signal processor (DSP), as well as a time-consumptive frequency comparator within each source port. If, for example, the audio information from a DVD must be sample rate converted, then the multiple channels streaming from the DVD will require a fairly expensive DSPs to perform the sample rate conversion. Thus, in some cases, sample rate conversion can be fairly complex and expensive to implement. Moreover, if sample rate conversion is used, the frequency comparison mechanism can often take too long and, therefore, introduce additional jitter and audible artifacts into the data received at the destination port.

If used, typical sample rate converters are employed at the source port of the network. A DVD by its nature contains compressed data. The compressed data must be decompressed before the data is sample rate converted to a frame rate of the network. Thereafter, the decompressed, sample rate converted data is sent across the network. Unfortunately, sending decompressed data consumes more network bandwidth than sending compressed data. It would therefore be desirable to sample rate convert at the destination rather than at the source. However, the frame rate of the isochronous data cannot be used at the destination since it is dissimilar from the sample rate at the source.

Conventional sample rate conversion at the source port can occur if, for example, the multimedia device has fewer channels and a lower bit resolution. Increasing the resolution of comparing the sample rate to the frame rate using counters with long count time-out will introduce jitter. If jitter is to be avoided, or if sample rate conversion proves too costly for rather complex multimedia device output, then isochronous transfer should be used in lieu of sample rate conversion. Isochronous data transfer may require possibly an additional byte for each channel of data being transferred. It is desirable that an improvement be derived over conventional techniques. The desired isochronous transfer technique should use sample rate conversion at the destination (with relative phase change or frequency information sent across the network), can use phase-locked loops (PLLs) within the source and destination (with multiply and divide factors in the source and destination known and synchronized to the network FSR), or can use a PLL solely on the destination port (with a phase difference sent across the network). The desirous mechanics of transferring data either synchronously or isochronously using sample rate conversion at the destination, arbitrary rate synchronous to the network, or a single PLL at the destination but not the source, are all advantages and improvements over conventional transfer techniques, the details of which are set forth below.

SUMMARY OF THE INVENTION

The problems outlined above are in large part solved by an improved communication system hereof. The communication system can be implemented to transfer sampled data synchronously or isochronously across the network. If streaming data is sent synchronously, then sample rate conversion can be implemented at the source node. More particularly, sample rate conversion can occur within a port (i.e., source port) of the source node. Alternatively, data can be sent synchronously (although using an isochronous transport mechanism to account for source/destination rate vs. frame rate differences) without performing a sample rate conversion at the source. In the latter instance, the source and destination ports can therefore use a circuit, such as a synchronous circuit containing dividers and multipliers to account for differences between clocks at the source and destination ports and the clock used to synchronize the frame transfer across the network, i.e., the FSR. The clocks at the source and destination are preferably at the same rate—i.e., the fs sample rate of data streaming from the multimedia device. The divide-by factors assume the clock rates at the source and destination ports are the same, yet are maybe slightly different from the FSR of the network. This technique arbitrarily sets the local clock using clock recovery from the frame transfer rate (i.e., the FSR) of the network and is hereinafter known as arbitrary rate synchronous.

If sample rate conversion proves too costly for certain multimedia devices, and the source sampling clock (fs) cannot be synchronized to the network frame transfer rate, then a PLL can be used and confined solely to the destination. The source port can simply use a phase comparator to compare the phase difference between the sampling clock (fs) local to the source port and the network frame rate (FSR). That difference can then be transferred to the destination port. The local clock offered by, e.g., a local crystal oscillator can vary from the FSR, yet the PLL within the destination port quickly locks to the local source clock and performs, for example, digital-to-analog conversion and amplifier functions needed to listen to the audio data streaming from the source at the source local clock sampling rate.

If sample rate conversion is viable at the source port, then data can be sample rate converted as it is being sampled at the source, and before it is sent across the network. However, sample rate conversion at the destination has many advantages over conversion at the source, particularly if the source data is compressed. If sample rate conversion occurs at the destination, then similar to the PLL embodiment, a phase comparator must be used at the source port. Yet, instead of sending only the phase difference between fs and FSR, the phase comparator can send either: (i) two sets of phase differences taken at successive cycles of FSR, (ii) two sets of phase differences taken several cycles of FSR apart, (iii) changes in phase difference over successive cycles or several cycles apart, or (iv) a frequency difference. The information from the source port phase (or frequency) comparator is sent to the destination port via the network where, depending on the form of the information, the destination port then has available the difference between fs and FSR, even though the data is sent isochronously. Armed with fs relative to FSR, the destination port can then perform sample rate conversion to derive the sampling clock, fs, at the destination port. That way, the amplifier or D/A converter at the destination can play the audio information at the same rate in which it was sampled, yet sent at a dissimilar rate across the network.

Multimedia devices that produce multi-channel, high bit resolution can avoid the complex sample rate conversion at the source port and instead can simply use a phase comparator at the source. The phase comparator can determine the phase difference within one sample clock and pass that phase difference to the destination, which recreates the source port sample rate with minimum jitter. Thus, while the source local clock can be a crystal oscillator, the destination clock is recreated from the source clock by transmitting the phase difference (or frequency difference calculated from relative changes in phase difference) across the network.

If the multimedia device does not produce overly complex output, then sample rate conversion can be performed at the source port. However, it may still be preferable that sample rate conversion be performed at the destination using a simple phase comparison at the source. The phase comparator compares relative phase differences between the local clock producing the local sample rate and the FSR of the network. A change in phase difference between one sample clock (or FSR clock) and another sample clock (or FSR clock) denotes a difference in frequency. In the sample rate conversion embodiment, the phase information is then forwarded to a sample rate converter at the destination to create the proper digital filter coefficients for the sample rate converter in order to convert the digital sample frequency to that of the network or a local reference clock at the destination. The sample rate converter in the destination port receives isochronous data as well as phase or frequency information, and then converts the isochronous data sent at a particular digital sample frequency to the network transfer rate, FSR, or the local reference clock frequency of the destination port.

In the instance of a digital PLL at the destination (and not the source), the local clock is created distally—i.e., from the sampling clock at the source. In sample rate conversion, the isochronously received data transfer rate is made to match synchronously transferred data at FSR of the network or the local clock at the destination. Arbitrary rate synchronous creates both the source and destination local clocks from a known and preferably fixed network clock or FSR. By way of example, the FSR can be either 48 KHz or 44.1 KHz. Regardless of the FSR, the sampling clock of the source and destination ports can be made equal to one another as either 48 KHz or 44.1 KHz by using a divider and/or multiplier in both the source and destination ports. A combination of a divider and multiplier can form a fractional divider that is then used, for example, in a PLL within the source and destination ports. Destination sample rate conversion embodiment converts the data rate to that of the network or the clock rate local to the destination node, digital PLL embodiment creates the destination port clock, and arbitrary rate synchronous embodiment creates both the destination port and source port clocks at the same rate from FSR. In each embodiment, however, the local clock is created from clock information sent or derived from the network.

The present communication system thereby includes a communication network. The network can also include a source port and a destination port. The source port and the destination port are configured within a source node and a destination node, respectively, of the network. Preferably, the source port is maintained as an integrated circuit confined to a single monolithic substrate, and similarly, the destination port is also maintained as an integrated circuit on a single monolithic substrate. The source and destination ports are separated by a communication link that can be wired or wireless, and can include optical fiber or copper in a wired configuration.

The source port in the case of the digital PLL embodiment comprises a comparator coupled to compare a phase difference between a transfer clock used to transfer frames of data across the network and a sampling clock local to the source port. The destination port includes a-PLL coupled to produce a clock local to the destination port that is locked in phase and frequency with a sampling clock local to a source port, as sent across the network. The comparator within the source port forwards a phase difference across the network, and the destination port uses that phase difference to lock with the sampling clock of the source port to recreate the destination port local clock.

In the case of a sample rate converter embodiment, a comparator within the source port compares a change in a phase difference between the frame transfer clock and the sampling clock local to or distal from that node. Preferably, sample rate conversion occurs in the destination port, whereby the phase or frequency difference information is sent from the comparator in the source port. The change in phase difference can be calculated on successive cycles of the frame transfer clock, or possibly N cycles apart. Calculation on successive cycles will allow frequency difference detection to occur faster than if calculation must wait until the Nth cycle. However, calculation N cycles apart will increase the frequency difference accuracy or resolution. A bit value for each phase difference, or a bit value representing a change in phase differences, or a bit value representing frequency difference calculated from the change in phase differences can be sent across the network to the sample rate converter in the destination port.

In the case of an arbitrary rate synchronous embodiment, the source and destination ports create the appropriate local clocks by multiplying and dividing the FSR of the network. The source port may require a master clock of, for example, 27 MHz. To create the master clock from a 48 KHz FSR, the multiplier and divider has a ratio of approximately 1125/2. To create the master clock from a FSR of 44.1 KHz requires a multiplier and divider ratio of 30000/49. The destination port also includes a multiplier and a divider to produce a master clock. The master clock in the destination port, however, need not be 27 MHz. Instead, the master clock in the destination port can be used directly to synchronize the frames of data to the rate in which the data streams from the source so that the data can be accurately reproduced in the local amplifier and/or digital-to-analog converter within the destination port. Depending on the destination port local frequency required to recompile the streaming data and the FSR of the network, the master clock within the destination port either has a frequency of some integer multiple of approximately 1.0, 147/160 or 160/147 of the FSR.

Whether the communication system or network employs a single comparator in the source and a digital PLL in the destination, sample rate conversion in the source or destination, or arbitrary rate synchronization in the source and destination, the present communication system utilizes the aforementioned source and destination ports that can be either a part of the multimedia device or within the network interface coupled to the multimedia device. The communication system thereby accommodates streaming synchronous data or streaming isochronous data. Where the multimedia device is a streaming device, the source port can be, for example, a DVD player, a CD player, or a digital video broadcast (DVB) receiver. The destination multimedia device can, therefore, be an amplifier, a digital-to-analog converter, and/or a speaker.

BRIEF DESCRIPTION OF THE DRAWING

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
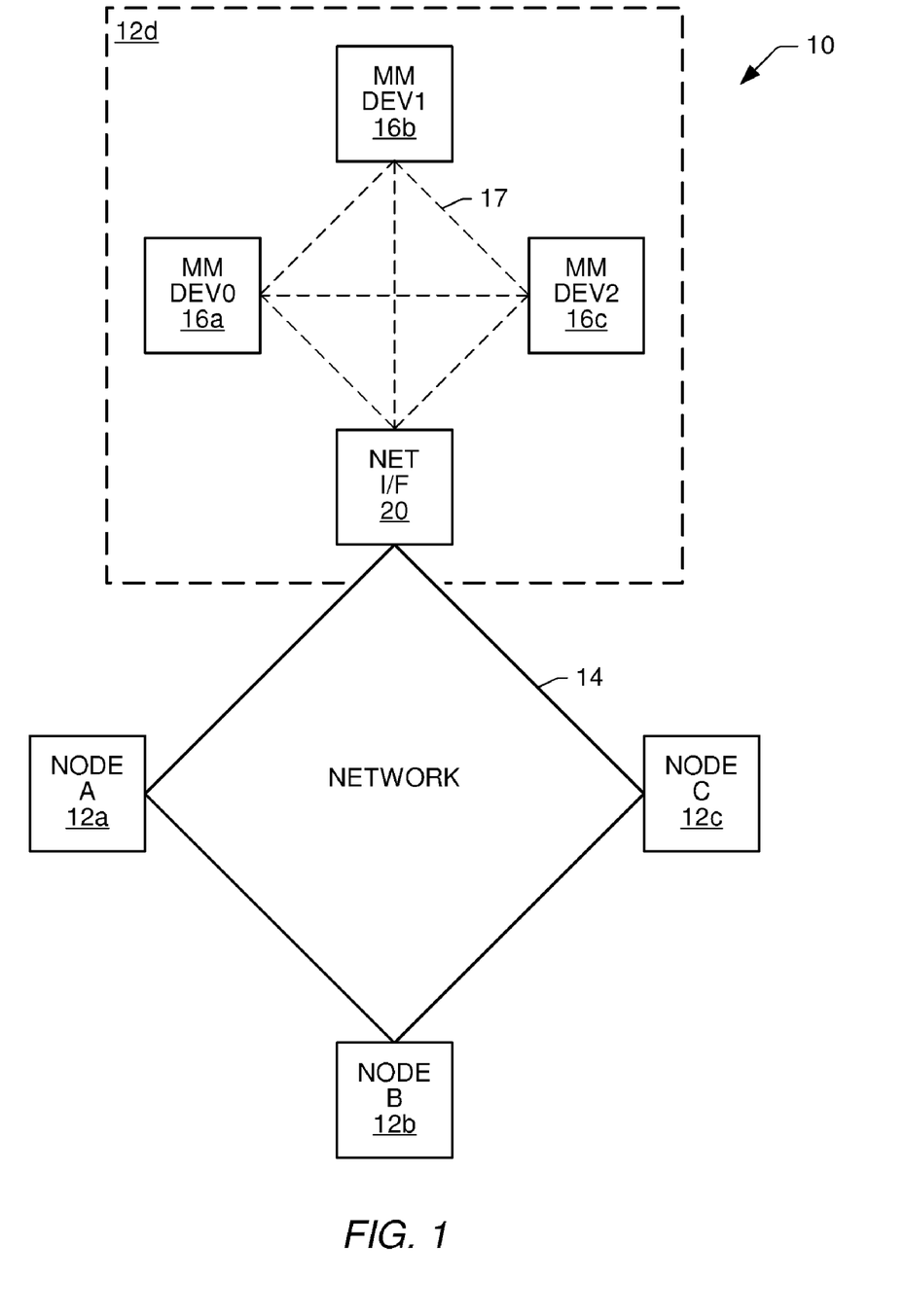
FIG. 1 is a block diagram of a communication system of interconnected nodes across which different types of data can be sent, such as streaming data (synchronous or isochronous data), control data and packet data (i.e., asynchronous data)

Turning now to the drawings, FIG. 1 illustrates one example of a communication system 10. Communication system 10 includes an interconnected plurality of nodes 12. For sake of brevity, only four nodes are shown. However, it is understood that system 10 can include more than four nodes and can also include multiple interconnected networks. The network shown in FIG. 1 is a ring or loop. However, it is also understood that the network backbone can be bus, star, or any other topology available to a network. Coupled between nodes 12 are corresponding transmission links 14. Transmission links 14 can be optical, acoustic, or electrical (wired or wireless).

Each node 12 is preferably localized to a particular area. Within each node is at least one multimedia device. As shown in node 12d, a node can have more than one multimedia device 16. If more than one localized device 16 is present, then a local transmission line or local bus can be used between multimedia devices 16 in either a loop or bus topology as shown by the alternative phantom lines 17.

Connected between device 16 and the network of nodes 12 is a network interface 20. If multiple devices 16 are localized to a node 12, the network interface 20 is disposed between a local bus 17 and the network. Interface 20 includes a communication port (i.e., bi-directional transmit and receive port) for transmitting communication between devices 16 arranged in nodes 12. The communication port can also be found within each of the multimedia devices 16 and, depending on its configuration, includes a clock pin, one or two signal pins and at least one data pin or a pair of data pins. As will be appreciated herein, the network interface function can be placed within one or more multimedia devices 16 or the network interface can be separate from the multimedia devices. A multimedia device 16 can be found on a single monolithic substrate and the network interface can also be on a single monolithic substrate. Thus, the communication port can be found on, for example, a monolithic substrate of a network interface or on a monolithic substrate of a multimedia device that may or may not contain the network interface. The communication port can also be a source port or a destination port. The source port is defined as the port which supplies data onto the network or local bus, and the destination port is the port destined to receive the data from the source port. For example, a source port within a first node can send data into the network that is received by a destination port within a second node, which then can operate as a source port for forwarding the data to another node having a destination port, and so forth until the data finally resides on its designated target. The source port can therefore be thought of as the originating port, and the destination port is considered the ultimate target.

Preferably, network interface 20 can include either a PLL, DSP, or simply a phase comparator, depending on the embodiment used for sending data across the network. Alternatively, the phase comparator can be either within the network interface 20, or outside the network interface 20 and simply form a part of a communication node. Additionally, network interface 20 could be, for example, within the multimedia device itself. Multimedia device 16, one or more of which are found within a node, is any device that can send and/or receive multimedia signals. Such signals include voice, audio, video, data files, or executable data programs. Examples of such devices include telephones, sensors, CD players, DVD players, video cameras, speakers, monitors, computers, personal digital assistants (PDAs), frequency modulated stereos, navigational systems, etc.

According to one example, the multimedia devices can be located within an automobile, and the communication system 10 can be employed within the automobile for linking the multimedia devices to one another or to multimedia devices within other nodes of the same automobile, or to another automobile, a satellite, or a stationary base station. Depending on whether data is encrypted or encoded at the multimedia device 16, communication system 10 allows transfer of such information to the destination as either streaming data (synchronous or isochronous), control data, or asynchronous (packetized) data. In addition, communication system 10 can allow transfer of all four types of data across one or more channels established within communication line 14 or across local bus 17. Communication system 10 therefore accommodates the different types of data in order to add versatility to the various types of multimedia devices 16 which can be used.

It is recognized that one or more multimedia devices 16 can sample data at a higher or lower sampling rate (fs) than the frame sync rate (FSR) of transmission line 14. For example, multimedia device 16 may be a CD player that samples at approximately 44.1 KHz. The CD player can stream data at, for example, 16 bits per sample audio channel (32 bits/stereo channel), therefore resulting in a bps Baud rate across the transmission line of 32 bits/stereo samplex 44.1K samples/second=1.4112 Mbps. The non-return to zero ("NRZ") data from the device can be encoded in several ways. Data can also be encoded using, for example, the well known Miller encoding technique. Alternative encoding includes bi-phase encoding, or encoding so that the encoded bit stream does not incur an accumulated DC value. The latter encoding mechanism is oftentimes referred to as DC-adaptive encoding, and is described in a commonly assigned co-pending application Ser. No. 09/710,220 entitled "An Encoder Within a Communication System that Avoids Encoded DC Accumulation and can Use Coding Violations to Synchronize a Decoder and Detect Transmission Errors."

If the frame sync rate (FSR) across transmission line 14 is different than 48 KHz (e.g., FSR could be chosen to match a CD sample rate of 44.1 KHz), then the streaming audio data from the 48 KHz sampled DVD player cannot always be placed synchronously through transmission line 14 to another node (i.e., a speaker). The streaming data can be sent as isochronous streaming data if that data is not sample rate converted at the source port. Thus, if the phase difference is merely compared and transmitted periodically with the data, the destination port can recompile the sample rate at the source port even though the data is sent isochronously.

If the streaming data is sent isochronously across transmission line 14, an additional byte may need to be reserved in each frame if the source port sampling rate is higher than the FSR of the network. Moreover, the phase difference may also require an additional byte to be placed periodically within the frames of data to allow the destination port PLL to compute its local clock rate synchronous to the source port sample rate in a digital PLL embodiment. If, for example, the FSR of the network is used to compile both the source port sample rate and the destination port master clock, appropriate divide-by and multiply-by circuitry can be used in the source and destination ports and, in fact, can use the same division fractions if, indeed, FSR remains constant and the source and destinations are clocked at the same rate for a given transaction in, for example, an arbitrary rate conversion and synchronization embodiment.

Figure 2:
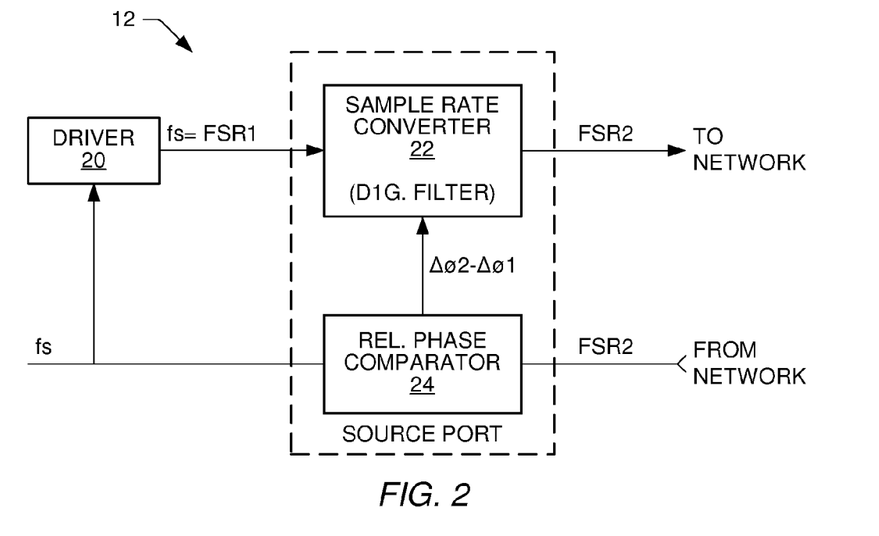
FIG. 2 is a block diagram of a network interface and, more particularly, to of a multimedia device that drives sampled data into a source port of a source node having a sample rate converter controlled by a frequency difference between the sample rate and the network frame rate.

FIG. 2 illustrates in more detail certain key components of a source port if sample rate conversion occurs at the source. Node 12, when configured as a source port, includes a multimedia driver 20. Driver 20 includes any device which can generate audio and/or video data. An example of such a driver includes a DVD drive, a CD drive, or possibly a DVB receiver. Data from driver 20 is placed into the node and eventually onto the network as bits of data. First, the data must be sampled at a regular and periodic sample rate (fs). For example, a DVD drive can play movie discs or audio discs. The audio information on the movie disc has either a 44.1 KHz or a 48 KHz sample rate and is generally compressed. The audio information on the audio disc is, however, typically PCM audio at 44.1 KHz or 48 KHz with sample rates at multiples of these two frequencies being allowed. Broadcast DVB also contains compressed audio with either a 44.1 KHz or a 48 KHz sample rate.

The fs sample rate is generally derived from a local reference. The local reference can be, for example, 27 MHz applicable to DVD drives that consist primarily of a mechanical drive and a system chip synchronized to the local reference clock. A DVB receiver can, on the other hand, employ a PLL that locks to the bitstream of the broadcast received by the receiver. A crystal oscillator based PLL can generate the master reference clock from the recovered bitstream clock or, however, more simplistic clock generation techniques can be used as will be described below.

The sample rate is preferably at or near the frame sync rate. As shown in FIG. 2, the sample rate (fs) can be at a frame sync rate (FSR1) that is dissimilar from the frame sync rate (FSR2) currently used by the network—i.e., the network may be locked to FSR2 at which another multimedia device is sending data synchronously across the network. For example, the sample rate can be at 44.1 KHz, however, the network might be locked to a different sample rate of 48 KHz. In order to change the frequency sampled from driver 20, a sample rate converter 22 may be used. Typical sample rate converters 22 use some form of digital filtering, such as a sample-and-hold filter, a liner interpolation filter, or the more complex multiple-order interpolation-decimation filters. While sample rate converters can be found in the source, they are typically not found in the destination since isochronously sent data does not contain the original sample clock that will be needed to sample rate convert at the destination port. FIG. 2 shows sample rate conversion at the source; however, it is understood that conversion can be applied at the destination instead of the source, with the phase/frequency comparator being placed at the source.

It may be desirable to perform sample rate conversion at the destination if the sourcing multimedia device is outputting compressed data. If conventional sample rate conversion were to occur at the source, the compressed data must be decompressed before conversion occurs. This entails sending decompressed data across multiple channels of the network creating an inefficient transfer mechanism and consuming undue amounts of network transfer bandwidth. A more efficient transfer mechanism is to keep the data compressed for bandwidth purposes, and send the compressed data across the network, and then decompress at the destination while performing sample rate conversion at the destination. This, however, involves sending either the phase difference between the original sample rate and the frame rate, or the actual frequency difference between the original sample rate and the network frame rate across the network.

Sample rate converter 22, shown in FIG. 2 at the source, serves a particular purpose of converting a sample rate to a higher or lower frequency frame transfer rate of frames sent across a network. Accordingly, a multimedia device can stream multi-bit, multi-channel outputs at fs onto each and every frame if, indeed, fs is converted so that it is equal to the frame transfer rate. A sample rate which matches the frame transfer rate ensures that the temporal relationship between samples is maintained across successive frames so there is no gap experienced on the destination port.

In order to convert the sample rate to the current network frame transfer rate (i.e., from FSR1 to FSR2), one must know the difference between the sample rate and the current network frame transfer rate (i.e., FSR2). It is important that the frequency comparison can be done as quickly as possible and not extended too long. For example, the comparison can be performed in successive cycles of FSR. However if higher resolution is needed, then the comparison can be performed over multiple (N) frame rate cycles, and not simply two successive cycles. Conventional frequency counters prove inadequate since many samples far exceeding N must expire before a frequency difference can be determined, thereby adding undue jitter to the sample rate converted data in the interim.

FIG. 2 illustrates a relative phase comparison being performed in block 24. A phase difference between fs (or FSR1) and FSR2 can be determined in one clock cycle and a successive phase difference between fs and FSR2 can occur in the next clock cycle. If the phase difference increases or decreases depending on which signal is being used as the reference, a frequency can be determined within a maximum of two clock cycles or, if greater accuracy or resolution is needed, within N cycles. The frequency determination is based on knowing fs, and then computing FSR2 from fs based on a change in phase difference. This proves advantageous over conventional frequency detectors which require numerous clock cycles.

The second phase difference, $\Delta\phi2$, minus the first phase difference, $\Delta\phi1$, thereby indicates a change in phase difference that equates to a frequency difference. If simply one phase difference is taken, it may be that the two signals transition at the same frequency yet are offset by a certain phase. However, if the second phase difference is dissimilar from the first phase difference, then it is known that a frequency difference exists and can be measured by subtracting the second phase difference from the first phase difference and feeding that phase difference to the sample rate converter 22. Sample rate converter 22 can then change the sample rate by possibly changing the coefficients on the digital filter. Once the sample rate has been converted to match the locked frame transfer rate or FSR2, the streaming data is sent synchronously across each successive frame of a plurality of frames needed to transfer the streaming message.

It is recognized that sample rate conversion can occur at the source port, but is preferably performed at the destination port with the frequency difference (or phase change difference) being sent over the network from the phase comparator in the source port. If converter 22 is in the destination port, then the data can be sent isochronously across the network, yet converted in the destination port to the master clock rate of the destination multimedia device acceptable for that device. Thus, sample rate conversion can occur either in the source port or the destination port.

Sample rate converting streaming data at the source can, however, be a fairly expensive procedure depending on the complexity of the multimedia device output. The sample rate converter is generally made up of not only serial input and output ports, but also includes FIFO buffers, a digital PLL, a filter (such as a FIR filter), and a DSP. If the driver is, for example, a DVD driver generating 6 channels of uncompressed audio at 96 KHz with a 24-bit resolution, then a sample rate converter might require multiple DSPs. Thus, in some instances, sample rate conversion at the source is simply too expensive and an alternative is needed. Moreover, sample rate conversion may also be too expensive even if done at the destination since, indeed, the same amount of complexity would occur at the destination as in the source.

Figure 3:
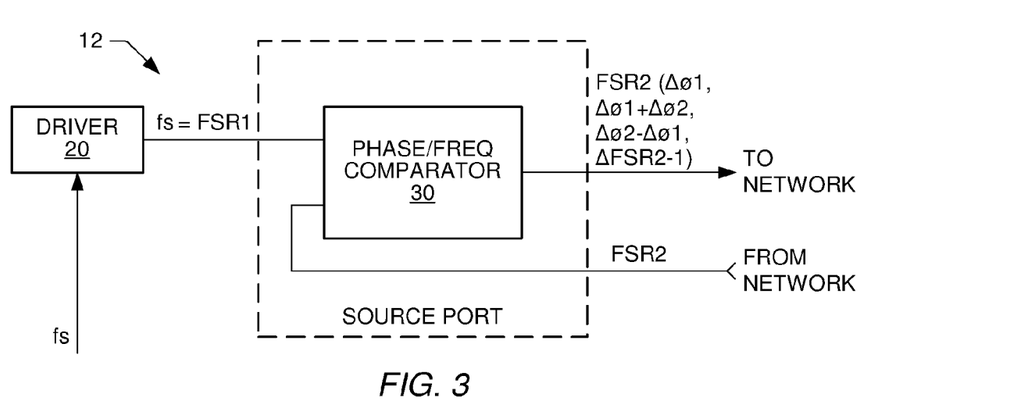
FIG. 3 is a block diagram of a network interface and, more particularly, of a multimedia device that drives sampled data into a source port of a source node having a phase comparator and/or frequency comparator that compares a phase or frequency difference between the sample rate and the network frame rate and forwards that information across the network in order to reproduce the source port sample rate at the destination using a destination PLL, or to generate the proper digital filter coefficients in a destination sample rate converter.

FIG. 3 illustrates a source port that can be used for the PLL embodiment separate and distinct from the sample rate converter embodiment or for a sample rate converter embodiment within the destination. Instead of placing a sample rate converter in the source port, FIG. 3 illustrates the simple use of a phase comparator 30 within source port 12. Instead of changing or converting the sample rate, comparator 30 compares the phase of sample rate fs (i.e., FSR1) to the frame transfer rate FSR2 at which the network is currently locked. The amount of phase difference is forwarded as a single bit or multi-bit byte across the network. The phase difference or $\Delta\phi1$ can have a different bit value depending on the phase difference magnitude. The sampled data can, therefore, be sent as isochronous data at the frame transfer rate of FSR2, but possibly with an additional byte reserved in each frame to accommodate a faster FSR1 relative to FSR2. In this way, the streaming data is maintained across each of the successive frames sent across the network.

Phase comparator 30 compares the phase difference between the leading or falling edges of each frame transfer clock or sample clock. A digital phase comparator can take place using a timer, for example. Phase comparator 30 can also be implemented to compare changes in phase difference among either successive FSR cycles or between the $1^{st}$ and Nth FSR cycle to derive a frequency difference for use by the sample rate converter at the destination node.

Figure 4:
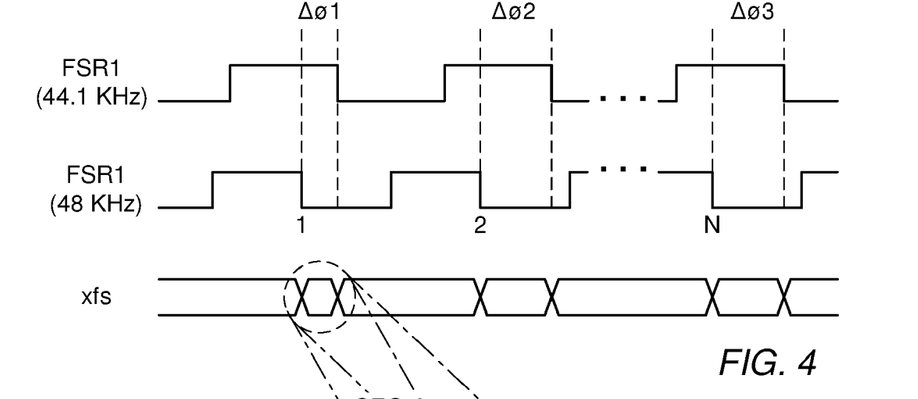
FIG. 4 is a timing diagram of the sample rate compared to the frame rate to generate a phase difference needed for the destination port PLL, and/or also to form relativity between two phase differences for computing a frequency difference needed for destination port sample rate conversion.

FIG. 4 illustrates in more detail the relative phase and frequency differences between FSR1 (fs) and FSR2. If FSR1 is at a lower frequency than FSR2, the frequency difference can be determined by subtracting $\Delta\phi1$ from $\Delta\phi2$, as shown. However, if all that is needed is a phase difference computation, $\Delta\phi1$ can be taken at regular sample rate intervals. Therefore, $\Delta\phi1$ will be repeated at each sample transition (i.e., at each leading or falling edge of FSR2 or FSR1). FIG. 4 illustrates the comparison being done at the falling edge of FSR2. However, the comparison can equally be performed at the leading edge of FSR2 or at the falling edge or leading edges of FSR1. The accuracy or resolution of that comparison is dependent on the frequency of the high speed sampling clock that is x times the sample rate. In other words, the high speed sampling clock is an integer multiple of the frame transfer rate, FSR. For example, the high speed clock can be 3072 fs or 24576 fs. If, for example, 6 cycles of 3072 fs separate the trailing edge of FSR1 and FSR2 (noted as $\Delta\phi1$), then a-byte indicating a binary 6 value is periodically sent across the network. Increasing the clock rate to 24576 fs will significantly increase the resolution of the binary value, and therefore instead of sending eight bits periodically, twelve bits can be sent.

Figure 5:
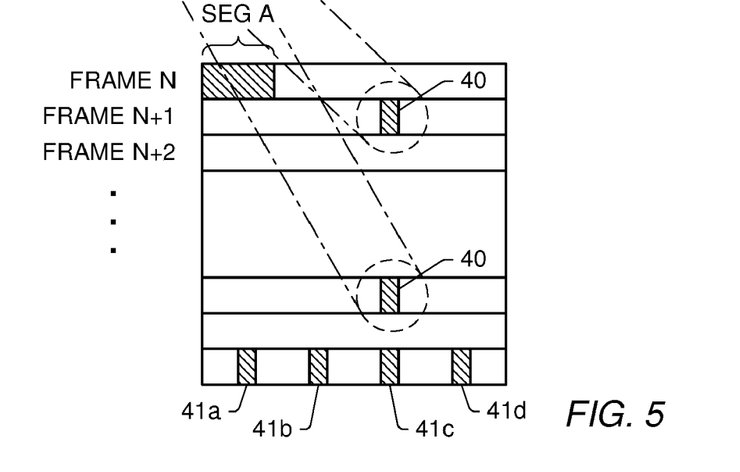
FIG. 5 is a plan diagram of several successive frames of data sent across the network, wherein each frame has a segment indicative of a time slot reserved for sending one or more channels of streaming isochronous or synchronous data, or asynchronous data, and a byte sent periodically across the successive frames that indicates a phase difference needed for the destination port PLL, or a phase change or frequency difference needed for destination port sample rate conversion.

As shown in FIG. 5, the phase difference sampled by the high speed clock (e.g., 3072 fs or 24576 fs) is encoded and periodically placed as a phase difference byte 40. Byte 40 can be placed either within each frame or possibly once per every N number of frames, where N is greater than 1. FIG. 5 illustrates multiple successive frames, where streaming data is sent either isochronously or synchronously from a source port in a particular segment or portion of successive frames. Thus, segment A is reserved in each of the frames to carry streaming data of a particular source port. Another segment of each frame can be reserved for receiving data from possibly another streaming source port, and so forth to fill up each frame and send multiple segments of streaming and packetized data across the network using channels reserved according to time division multiplexing, for example.

Phase difference $\Delta\phi1$ is shown sent in at least one bit (e.g., an eight-bit byte or twelve bits) periodically across the network as shown in reference numeral 40. The phase difference is thereafter used by the PLL in the destination port. However, if the destination port is to perform sample rate conversion, then a frequency difference is needed. The frequency difference can be computed in the source port or, instead, the source port can simply send a phase difference, and the frequency difference is then calculated in the destination. So, for example, either $\Delta\phi1$ bit value and $\Delta\phi2$ bit value is periodically sent preferably across successive frames (see reference numerals 41a and 41b), or $\Delta\phi2-\Delta\phi1$ bit value is periodically sent (see reference numeral 41c), or difference in frequency bit value as computed from $\Delta\phi2-\Delta\phi1$ at the source is periodically sent (see reference numeral 41d).

Figure 6:
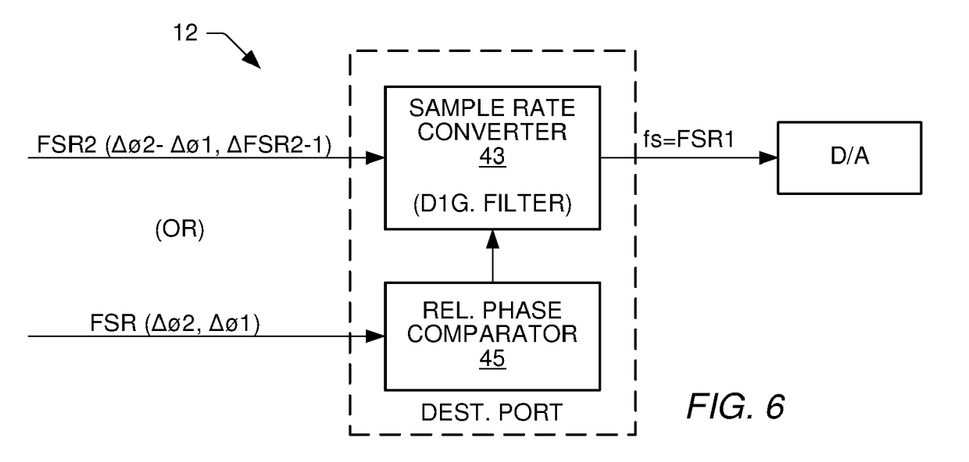
FIG. 6 is a block diagram of a network interface at a destination port that can receive phase differences, relative phase changes, or frequency differences between the sample rate and the network frame rate of data sent isochronously to the destination port for destination port sample rate conversion.

FIG. 6 illustrates the destination port 12 that receives frames and frequency difference information from the source port 12 of FIG. 3. Thus, the combination of FIGS. 3 and 6, represent sample rate conversion at the destination port using phase difference bit values or computed frequency different bit values sent across the network from the phase/frequency comparator 30 of FIG. 3. FIG. 6 indicates that if the bit value is 41c or 41d (see FIG. 5), then all that is needed in the destination port is a sample rate converter 43, similar to converter 22 of FIG. 2. However, if the bit values are 41a and 41b, then the change in phase comparison must be done in the destination port by comparator 45, wherein the result is then used by converter 43. Either option is viable to destination port 12 of FIG. 6 depending on the values being sent by the source port.

Figure 7:
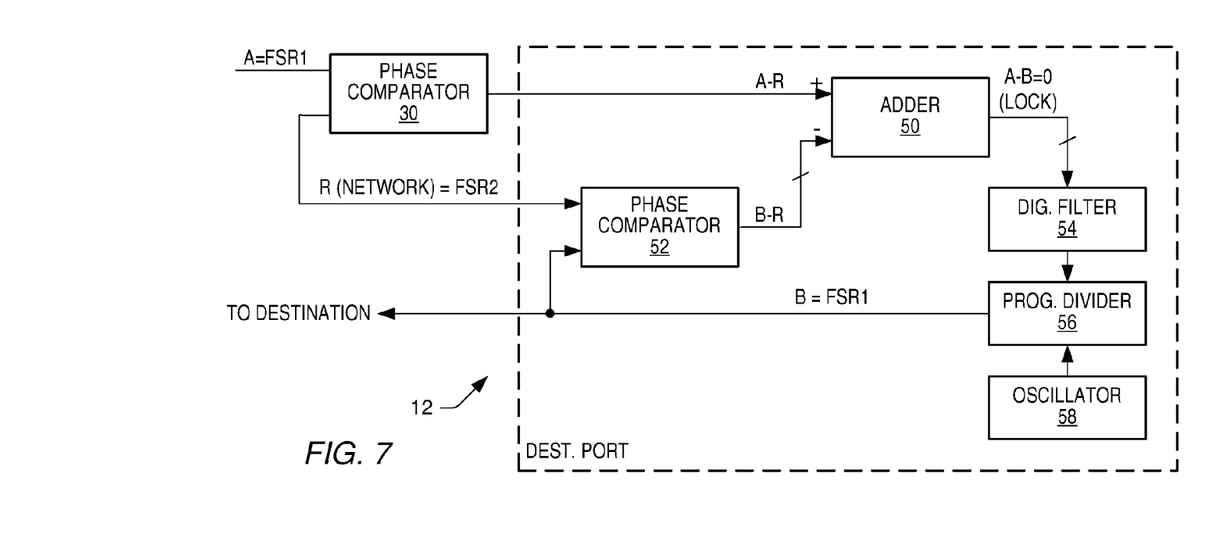
FIG. 7 is a block diagram of the destination port PLL preferably implemented as a digital PLL that subtracts the phase difference between the source sample rate and the network frame rate and the phase difference between the destination sample rate and the network frame rate to lock a created destination clock rate at the source sample rate, regardless of the network frame rate.

FIG. 7 illustrates a PLL within the destination port that avoids using the complex sample rate converter circuitry of FIG. 2. The phase comparator 30 (similar to that of FIG. 3) compares the sample rate fs=FSR1 to the network transfer rate of FSR2. FSR1 is illustrated as numeral A, while the network frame rate is illustrated as numeral R. Phase comparator 30 will, therefore, yield a phase difference of A–R, as shown.

Instead of the destination port being a sample rate converter, FIG. 7 illustrates the destination port 12 having a PLL that receives phase difference information from the source port and, particularly, the phase comparator 30. Adder 50 subtracts the phase difference between A–R and the output from another comparator 52. Adder 50 and digital filter 54 can form a part of a DSP. Phase comparator 52 compares the network transfer frame rate clock edge to the local sample rate of the destination port, shown as reference B. Reference B is made equal to reference A due to the feedback from digital filter 54 and programmable divider 56. Divider 56 receives a high frequency clock from oscillator 58 that, based on the control output from filter 54, divides the oscillator output to the appropriate frequency and phase needed to lock the local sampling clock B to the source port sampling clock A.

The combination of digital filter 54, programmable divider 56, and oscillator 58 serve to integrate and filter oscillator output of the PLL to ensure that eventually A=B, and that the PLL will be locked. FIG. 7 thereby indicates that a simple phase comparator can be placed in the source port, with a digital PLL placed in the destination port so that the source port sampling clock can be recreated in the destination port by conveying the phase difference across the network. This avoids having to use complex sample rate conversion mechanisms in the source port, with the overhead of a DSP in that node. Instead, a single PLL can be used in the destination port and thereby allows isochronous data to be sent across the network with clock recovery being used in the destination port in lieu of sample rate conversion or jitter associated with localized crystal oscillators.

Digital filter 54 includes any low-pass digital filter and oscillator 58 includes any high-speed oscillator that can be divided down to produce a local sampling clock B. According to one example, the local sampling clock can be derived at either 44.1 KHz or 48 KHz to match the sampling clock within the source port and can be similar to or different from the frame transfer rate of frames sent across the network.

Figure 8:
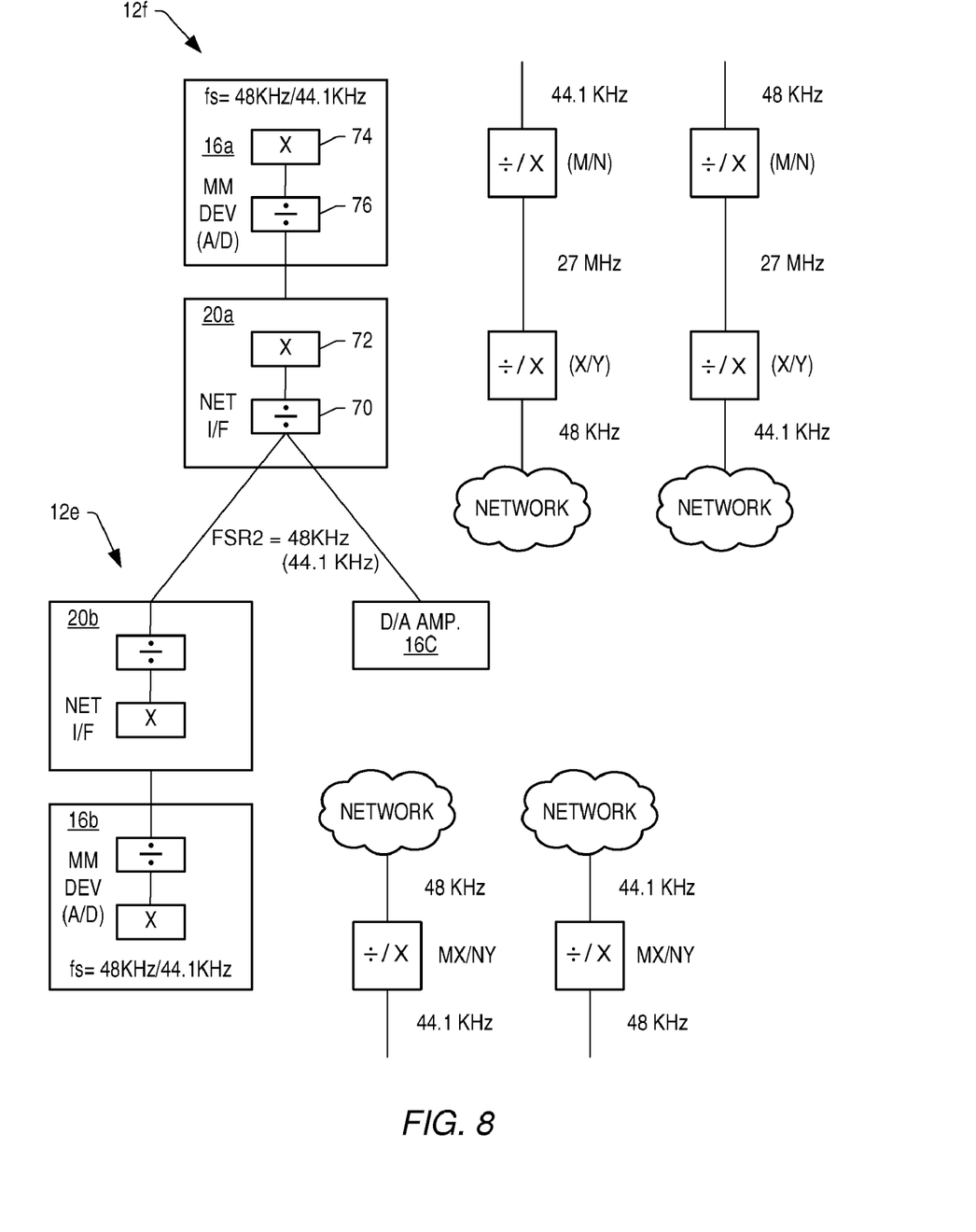
FIG. 8 is a block diagram of multiply and divide integer numbers used to generate clocks at the source and destination ports for sampling streaming data at the source and playing at the destination the sampled data at the same rate in which it was sampled using a common frame rate of the network rates without having to use sample rate conversion at the source or destination.

FIG. 8 illustrates yet another embodiment. Instead of performing sample rate conversion in the source port (FIG. 2), destination port (FIG. 6) or creating a local clock in the destination port using a digital PLL (FIG. 7) using a phase/frequency difference transmitted across the network, FIG. 8 illustrates frequency multipliers and dividers in the source and destination ports that produce an appropriate frequency local to the source and destination ports derived from a synchronous network. The embodiment of FIG. 8 is, therefore, alternatively known as arbitrary rate synchronization, where the sample rate at the source port and destination port is an integer multiple of the frame rate (FSR) sent across the network. In particular, the frame rate within the network is used to generate a clocking signal local to the nodes. The clocking signal can be arbitrarily chosen using fractional dividers or a combination of an integer divider and an integer multiplier in the localized nodes.

FIG. 8 illustrates a network interface 20a within the source port having possibly a divider 70 and a multiplier 72. Alternatively, network interface 20a can simply have a fractional divider instead of a separate multiplier and divider. Furthermore, the fractional divider or separate multiplier and divider of network interface 20a can actually be made a part of and integrated with multimedia device 16a.

According to one example, separate fractional dividers and/or separate dividers and multipliers can be implemented so that the multiplier 74 and divider 76 within device 16a produces a fractional divide-by ratio of M/N separate and distinct from divide-by ratio of X/Y of network interface 20a. However, the cumulative divide-by factor of M/N and X/Y is preferably equal to the cumulative divide-by ratio of (M/N)(X/Y) of the destination port, labeled 12e, separate and apart from the source port, labeled 12f. By making the cumulative divide-by ratio in the source and destination ports equal, it is assured that the frame sync rate (FSR2) of 48 KHz (or 44.1 KHz) can be fractionally divided in equal amounts to present the same sample rate in the source and destination ports. For example, if the network frame rate is 48 KHz and the source and destination sample rate is 44.1 KHz, then a cumulative ratio of 147/160 occurs. However, if the network frame rate if 44.1 KHz and the source and destination sample rate is 48 KHz, then the cumulative ratio is 160/147.

Like the source port 12f, destination port 12e can also include a network interface 20b and a multimedia device 16b, such as an amplifier and/or a digital-to-analog converter. Alternatively, the network interface and the multimedia device can simply be combined into a multimedia device 16c, for example, where the fractional divide-by occurs entirely within and is integrated within the amplifier and/or D/A converter 16c. The integrated or separate dividers and multipliers of the destination port are equal to the dividers and multipliers in the source port in order for the local sample rates to be equal and derived from the frame sync rate (FSR2).

As part of the DVD drive, a system controller will control the drive, decode the audio and video information, and convert the audio information to analog while sending the uncompressed video to a display. The controller is clocked by a local 27 MHz crystal oscillator or, as shown in FIG. 7, is clocked by a 27 MHz clock that is derived from the frame sync rate. As audio data is read from the drive, it is decompressed in case of a movie and, if necessary, is forwarded to a D/A converter. The sample rate of the D/A converter is fixed and unchanged. It is generated directly or implicitly from the 27 MHz reference. As an example, a PLL with a frequency conversion ratio of 2/1125 will convert the 27 MHz reference clock of the controller to the 48 KHz sample clock needed to sample the audio data from the drive. A conversion ratio of 49/30000 will convert 27 MHz to 44.1 KHz. The audio data from the disc must be read at exactly the same sample rate as the D/A converter clock in the destination. In other words, one audio sample must read from the disc, whether compressed or PCM, each D/A converter sample clock cycle. Since the sample clock of the D/A converter is synchronous to the local 27 MHz reference clock or master clock, the audio data coming off the disc is synchronous to the 27 MHz local master clock.

Figure 9:
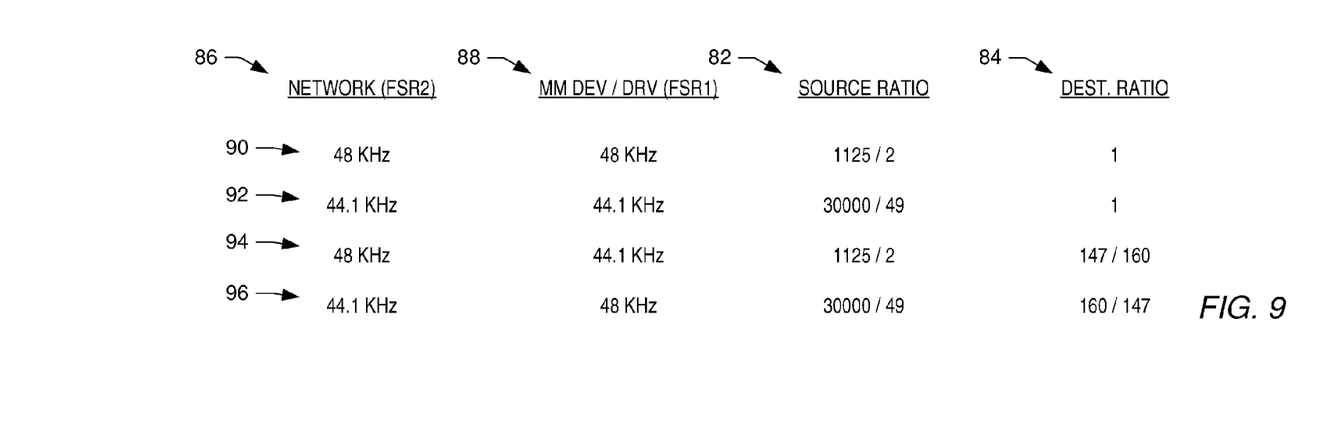
FIG. 9 is a table of certain multiply and divide ratios useable for 44.1 KHz and 48 KHz exemplary sample rates and frame transfer rates for the arbitrary rate synchronous transfer mode of FIG. 8.

FIG. 9 illustrates a table of certain ratios achievable by the fractional dividers placed in the source port 82 and the destination port 84. The examples are ones taken from the various permutations at which a network transfers frames of data at a frame sample rate (FSR2) and at which the multimedia device/driver in the source and destination samples the data locally (fs=FSR1). The network frame rate is shown as reference numeral 86 and the local sample rate that is equal in both the source and destination ports is shown as reference numeral 88.

A DVD drive when playing discs recorded at some multiple of 48 KHz is easily interfaced to the network operating at a 48 KHz frame rate. The 48 KHz frame rate clock of the network is multiplied by 1125/2 at the source port, which produces the 27 MHz clock required by the DVD controller. This can be implemented with a clock multiplying PLL or a fractional divider, as will be described later. The audio information from the movie is decompressed and converted to an analog signal by the D/A converter synchronous to the network frame rate. The destination port simply plays the audio information at the destination without requiring any multiply or divide ratio. Accordingly, the only divide-by ratio is that found within the multimedia device needed to convert the 48 KHz source sample rate to a master clock of 27 MHz, as shown by line 90.

The sample clock generated by the DVD controller is some integer ratio multiple of the local 27 MHz master clock. If the clock is generated from the network timing, then the sample clock is related to the network frame rate (FSR2) by some integer ratio. Since this ratio is fixed, the same ratio can be used at the amplifier to generate the exact same sample clock frequency as in the drive. This clock can then be used to drive the D/A converters without the need for sample rate conversion. In the example shown in FIGS. 8 and 9, the ratio between the 27 MHz master reference clock and the D/A sample clock in the DVD controller may be 30000/49 in order to convert from 44.1 KHz to 27 MHz. The ratio at the destination port, however, remains equal to 1. The preceding example is shown as line item 92.

Line item 94 illustrates the local source and destination sample rates at an integer multiple of 44.1 KHz, yet the network frame rate is 48 KHz. In order to achieve a 27 MHz local master clock in the source port, a ratio of 1125/2 is needed. To generate the 44.1 KHz sample rate, the 27MHz clock is multiplied by 49/30000. The cumulative factor is (1125/2)(49/30000), or 147/160. As shown, the source ratio 82 is a ratio needed to derive the master clock, however, the cumulative source ratio is source ratio 82 as well as another ratio needed to convert master clock to the audio sample clock. In the example shown, the source ratio is either 147/160. The same is true for the destination ratio. As illustrated in line item 96, if the frame transfer rate is 44.1 KHz and the audio sample rate on the disc is 48 KHz, the source ratio is 30000/49 to generate the 27 MHz master clock at the source. The cumulative ratio is (30000/49)(2/1125), or 160/147. The same is true for the destination ratio.

Figure 10:
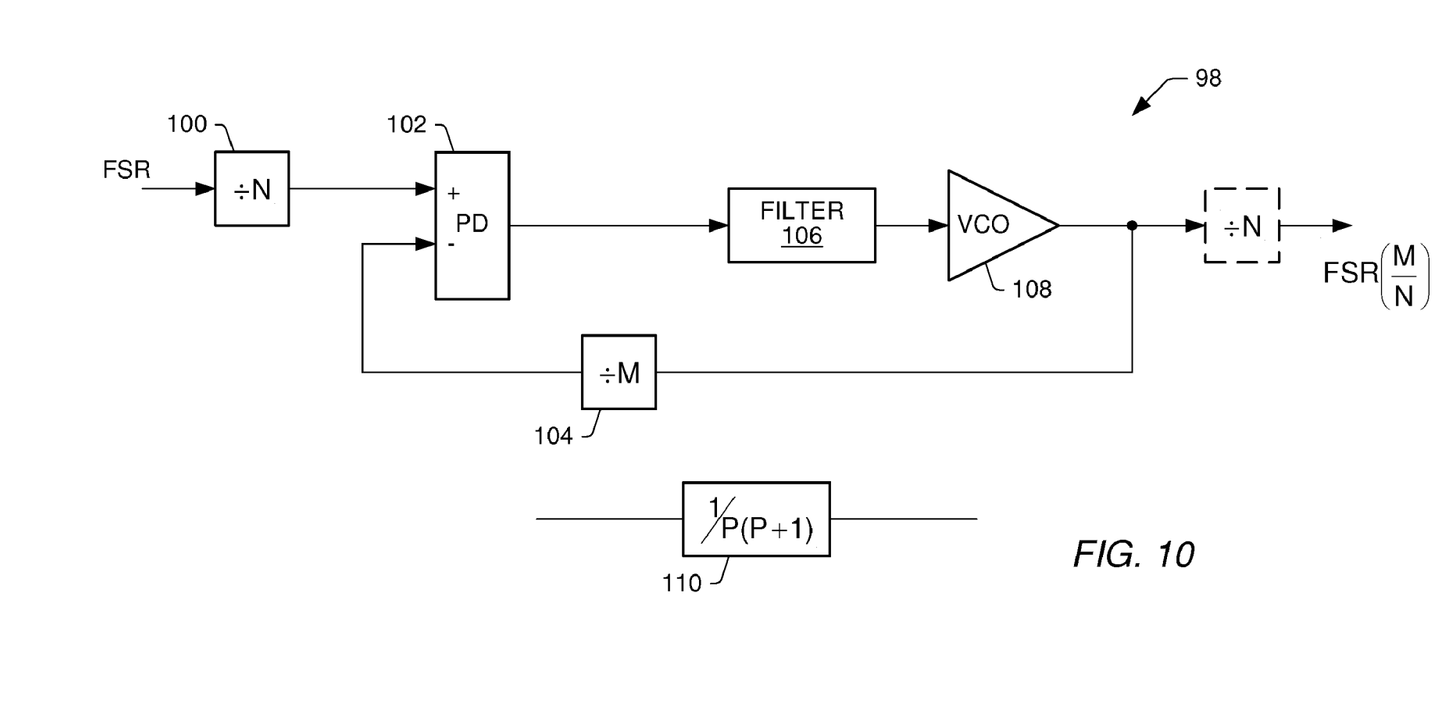
FIG. 10 are block diagrams of alternative circuits for performing fractional conversion of network frame rate to the source master clock or sample rate as well as the destination sample rate.

FIG. 10 illustrates alternative mechanisms in which a circuit can be employed to produce a fractional divider. For example, the M/N factor can be obtained using a PLL 98 as shown. PLL 98 is shown with a N divider 100 on an input to a phase detector 102. In the feedback loop is M divider 104 (effectively a M multiplier) and the normal low-pass filter 106 and oscillator 108 are also present. The combination of the divider and multiplier present a fractional divider, even though the divider is an integer amount and the multiplier is also an integer amount. PLL 98 can form the fractional divider ratios in the network interface to reduce the frame rate to the master clock or can also be used to generate the sample rate on the destination port (i.e., provide the X/Y or (M/N)(X/Y) ratios). PLL 98 can also be a part of the multimedia device to provide the M/N ratio between the sample rate and the master clock.

A fractional divider 110 can be formed by possibly dividing by P for say 100 cycles and then dividing by P+1 for one cycle, and then repeating this process for the next 101 cycles to achieve a fractional $1/(P \times 1.01)$ divide-by amount. An integer (or fractional) divider can be placed on the input node at divider 100, the feedback node, or on the output node 112 of the PLL, as shown in phantom to indicate the option.

Numerous variations and modifications will become apparent to those skilled in the art once the above disclosure is fully appreciated. It is intended that the following claims be interpreted to embrace all such variations and modification.

What is claimed is:

1. A destination port of a communication network, comprising a sample rate converter coupled to receive phase or frequency difference information between a transfer clock used to transfer data across the network and a sampling clock local to a source port coupled to the destination port via the network, wherein the sampling clock transitions at a rate equal to a sample rate of streaming data sent from a multimedia device onto the network, and wherein the frequency difference information is calculated as a difference measured on a first cycle of the transfer clock or the sampling clock and a Nth cycle of the transfer clock or the sampling clock such that a first phase difference on the first cycle is compared to a second phase difference on the Nth cycle.

2. The destination port as recited in claim 1, wherein the transfer clock comprises a cycle equal in duration to a frame of data sent across the network.

3. The destination port as recited in claim 1, wherein the transfer clock transitions at a frequency synchronous with a rate at which a plurality of frames are sent across the network.

4. The destination port as recited in claim 1, wherein the frequency difference information is calculated on successive cycles of the transfer clock or the sampling clock such that a first phase difference on one cycle is compared to a second phase difference on the successive cycle.

5. The destination port as recited in claim 1, wherein the phase difference information comprises two values, a first value corresponding to a first phase difference measured at one transition of the transfer clock or the sampling clock and a second value corresponding to a second phase difference measured at another transition of the transfer clock or the sampling clock.

6. The destination port as recited in claim 1, wherein the phase difference information comprises a value corresponding to a first phase difference measured at a first transition of the transfer clock or sampling clock subtracted with a second phase difference measured at a second transition of the transfer clock or sampling clock.

7. The destination port as recited in claim 1, wherein the phase difference information comprises a value corresponding to a frequency difference between the transfer clock and the sampling clock.

8. The destination port as recited in claim 1, wherein the converter is adapted to change coefficients of a digital filter local to the destination port to match a frequency of the sampling clock.

9. The destination port as recited in claim 1, wherein the source port sources streaming data onto the network.

10. The destination port as recited in claim 1, wherein the source port includes a multimedia device selected from the group consisting of a digital video device (DVD), compact disk (CD) and digital video broadcast (DVB) receiver.

11. The destination port as recited in claim 1, further comprising a multimedia device selected from the group consisting of an amplifier and a digital-to-analog converter.

12. The destination port as recited in claim 1 is embodied upon a single, monolithic substrate.

13. A communication network, comprising:
   a source port;
   a destination port coupled to the source port by the network;
   a plurality of frames of data, each of which are transferred across the network at a frame transfer rate;
   a comparator coupled to produce:
      a first compare result during a first clock cycle of a phase difference between a transfer clock transitioning at the frame transfer rate and a sampling clock used to sample data at the source port;
      a second compare result during a second clock cycle of a phase difference between the transfer clock and the sampling clock; and
   a sample rate converter at the destination port coupled to receive a frequency difference corresponding to the first and second compare results for changing coefficients of a digital filter local to the destination port.

14. The communication network as recited in claim 13, further comprising an adder local to the source port that combines the first and second compare results in the source port and forwards the frequency difference across the network to the sample rate converter.

15. The communication network as recited in claim 13, further comprising an adder local to the destination port that combines the first and second compare results in the destination port and forwards the frequency difference to the sample rate converter.

16. The communication network as recited in claim 13, wherein the first and second clock cycles are clock cycles of the transfer clock or the sampling clock.

17. The communication network as recited in claim 13, wherein the second clock cycle succeeds the first clock cycle.

18. The communication network as recited in claim 13, wherein the second clock cycle is the next clock cycle after the first clock cycle.

19. The communication network as recited in claim 13, wherein the second clock cycle is Nth clock cycle after the first clock cycle.

20. The communication network as recited in claim 13, wherein the sample rate converter changes a sample rate local to the destination port proportional to a ratio by which the second compare result is dissimilar from the first compare result.

21. The communication network as recited in claim 13, wherein the network forwards the plurality of frames synchronously across the network.

22. A destination port of a communication network, comprising a sample rate converter coupled to receive frequency difference information between a transfer clock used to transfer data across the network and a sampling clock local to a source port coupled to the destination port via the network, wherein the frequency difference information is calculated on successive cycles of the transfer clock or the sampling clock such that a first phase difference on one cycle is compared to a second phase difference on the successive cycle.

23. The destination port as recited in claim 22, wherein the transfer clock comprises a cycle equal in duration to a frame of data sent across the network.

24. The destination port as recited in claim 22, wherein the transfer clock transitions at a frequency synchronous with a rate at which a plurality of frames are sent across the network.

25. The destination port as recited in claim 22, wherein the sampling clock transitions at a rate equal to a sample rate of streaming data sent from a multimedia device onto the network.

26. The destination port as recited in claim 22, wherein the frequency difference information comprises two values, a first value corresponding to a first phase difference measured at one transition of the transfer clock or the sampling clock and a second value corresponding to a second phase difference measured at another transition of the transfer clock or the sampling clock.

27. The destination port as recited in claim 22, wherein the frequency difference information comprises a value corresponding to a first phase difference measured at a first transition of the transfer clock or sampling clock subtracted with a second phase difference measured at a second transition of the transfer clock or sampling clock.

28. The destination port as recited in claim 22, wherein the frequency difference information comprises a value corresponding to a frequency difference between the transfer clock and the sampling clock.

29. The destination port as recited in claim 22, wherein the converter is adapted to change coefficients of a digital filter local to the destination port to match a frequency of the sampling clock.

30. The destination port as recited in claim 22, wherein the source port sources streaming data onto the network.

31. The destination port as recited in claim 22, wherein the source port includes a multimedia device selected from the group consisting of a digital video device (DVD), compact disk (CD) and digital video broadcast (DVB) receiver.

32. The destination port as recited in claim 22, further comprising a multimedia device selected from the group consisting of an amplifier and a digital-to-analog converter.

33. The destination port as recited in claim 22, is embodied upon a single, monolithic substrate.

* * * * *